June 5, 1956   J. C. WELLINGTON, JR   2,749,450
SERVO-MOTOR LOAD DIVISION CONTROL SYSTEM
Filed Aug. 25, 1953
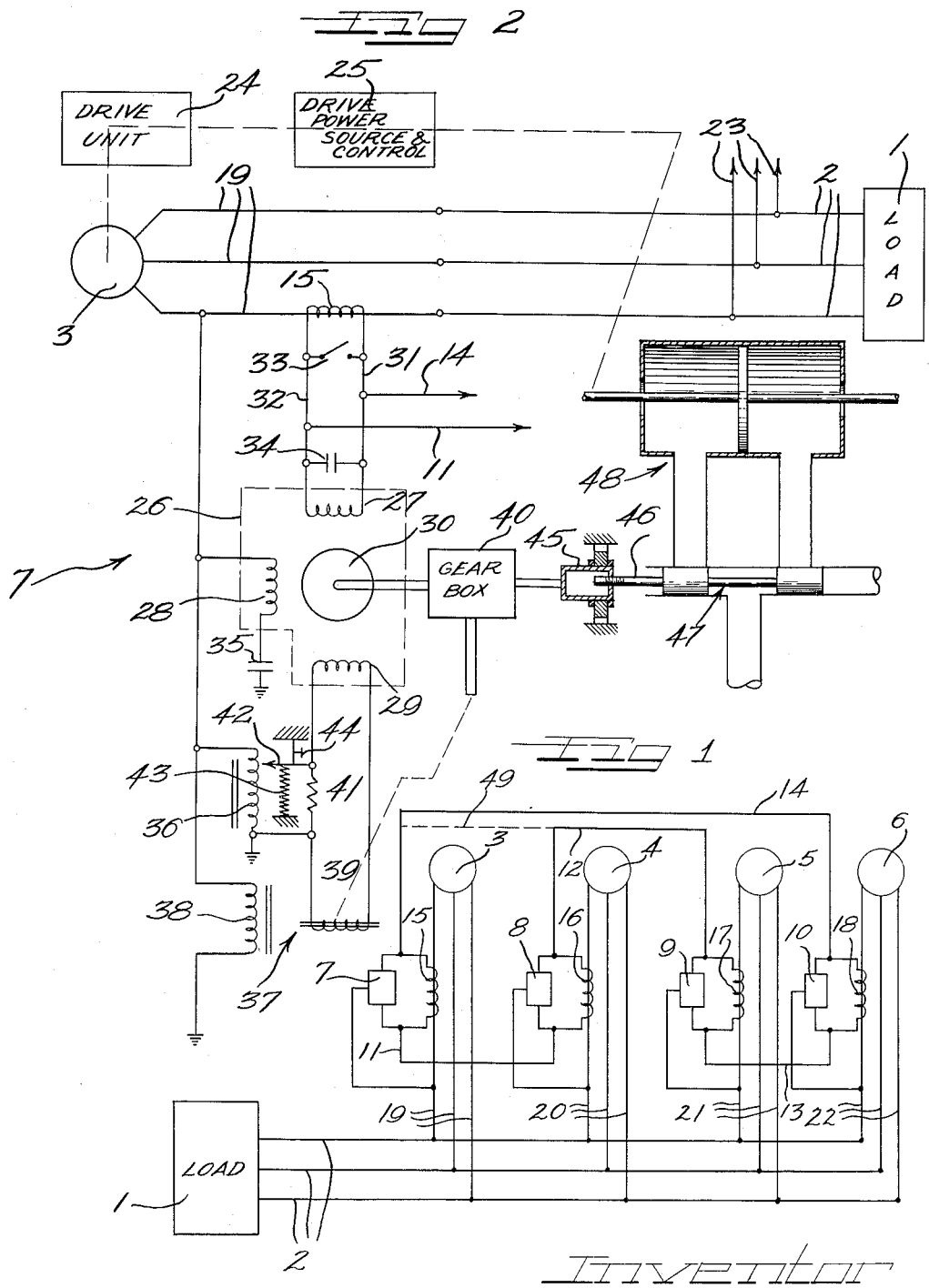
Inventor
Joseph C. Wellington, Jr.
By Hill, Sherman, Meroni, Gross & Simpson
Attys United States Patent Office 2,749,450
Patented June 5, 1956

2,749,450

SERVO-MOTOR LOAD DIVISION CONTROL SYSTEM

Joseph C. Wellington, Jr., South Euclid, Ohio, assignor to Thompson Products, Inc., Cleveland, Ohio, a corporation of Ohio Application August 25, 1953, Serial No. 376,498

16 Claims. (Cl. 290—4)

The present invention relates to a servo-motor load division trim system. More particularly, the present invention relates to a system for insuring highly accurate load division between parallel alternators or generators or the like.

When paralleling alternators, for example, a three-phase bus electrical supply line system, it has been found to be of great importance to insure proper load division between the alternators within a preselected range on each side of the value of the average load, real and reactive, for each of the alternators. Numerous systems have heretofore been developed for the accomplishment of this objective, but they usually have had several drawbacks such as instability and "floating," as well as having operational characteristics falling outside the preferred range of plus or minus about 10% of the average load. Another difficulty and drawback which has accompanied attempted utilization of most heretofore known systems is the lack of adaptability of those systems for remote control for accurately varying the load proportion on the individual alternators of the system. Still another problem which has accompanied the utilization of many heretofore known systems lies in their failure to include zero seeking characteristics. This latter problem is, in part, a result of the floating characteristic of these systems.

It is, therefore, an important object of the present invention to provide an effective, accurate load division control system.

It is another important object of the present invention to provide a load division control system operable to maintain load division within close preselected limits about the average load boundary.

Still another important object of the present invention is to provide a servo-motor load division trim system having individual alternator load proportion control features.

Still another object of the present invention is to provide a remotely controllable load division trim system for each of a plurality of paralleled alternators.

Yet another object of the present invention is to provide a load division control system having trimming qualities and non-floating zero seeking features.

Yet another object of the present invention is to provide a servo-motor load division trim system with means to manually control and automatically control the position of the rotor of the servo-motor, thereby controlling the load proportion on each alternator.

Now, another object of the present invention is to provide remotely controllable means for varying the speed and load division to an individual of a plurality of alternators for connecting and/or disconnecting the alternators, individually, and the remaining system.

Still another object of the present invention is to provide a load division trim control system wherein current sensing elements, such as transformers or the like, for each alternator control are so interconnected as to effectively be short circuited under balanced conditions, thereby properly operating the same into low impedances and providing an effective balance therebetween under all load conditions.

Still another object of the present invention is to provide a series load division control network for each of a plurality of alternators coupled to a common bus electrical supply line, in parallel.

Still other objects, features and advantages of the present invention will become readily apparent from the following detailed description of the principles of the present invention and a preferred embodiment thereof, from the appended claims, and from the accompanying drawings, in which there is disclosed a preferred embodiment of the present invention disclosed fully and intended to provide a full disclosure of each and every detail shown thereon, forming a part of the instant disclosure, in which like reference numerals refer to like parts, and in which:

Figure 1 is a block diagrammatic illustration of a system embodying the principles of the present invention and illustrating a group of four alternators tied, in parallel, to a common bus line supplying electrical power to a load, and further illustrating a preferred form of interconnection between control systems for each of the individual alternators; and Figure 2 is a schematic illustration of a preferred form of control system for an individual one of the several parallel alternators of Figure 1, the control system being identical for each of the alternators and the control systems being tied together as indicated in Figure 1.

A composite system incorporating the principles of the present invention for load division trim control is illustrated in block schematic form in Figure 1. The system therein illustrated has a load 1 supplied preferably with three-phase electric power from the bus supply 2. The electrical energy supplied to the bus and therefore to the load is generated by a group of alternators or the like, 3, 4, 5 and 6, connected in parallel to supply a proper amount of power for the load 1 to the bus 2. In many installations the parallel connection of a plurality of alternators is necessary since either one alternator is of insufficient size or it is found impractical to utilize but one alternator for all load requirements.

As hereinabove made evident, it is also important that the alternators 3, 4, 5 and 6, four of the same being illustrated for purposes of the example and not as a limitation on the breadth and scope of the present invention, each be provided with a load division control transducer 7, 8, 9 and 10, respectively. The transducers, which are hereinafter described in detail as an important part of the present invention and constructed in accordance with the principles of the present invention, are each effective to control the loading and load division on each of the alternators to which they are individually tied, electrically. Further, these transducers are serially interconnected via lines 11, 12, 13 and 14 with the current transformers of each thereof as indicated at 15, 16, 17 and 18, respectively, connected in series aiding relation whereby they are adapted to operate into low impedances and effectively short circuit each other through themselves under balanced load division and no load conditions.

The current transformers 15, 16, 17 and 18 are each coupled to one line of the three-phase lines of each of the alternators, respectively, the lines of the alternators 3, 4, 5 and 6 being indicated generally at 19, 20, 21 and 22, respectively, to sense the real load current on each of the alternators individually. So long as the reactive load division is maintained equal and proper for each of the alternators in accordance with the principles of well known systems separate from the systems of the present invention and not herein illustrated, the real load division will be maintained proper and equal if the real load currents and real load potentials are maintained proper and equal. By serially sensing the real load currents coupled to the individual transducers 7, 8, 9 and 10, proper load division sensing signals are applied to the transducers for appropriate action on the alternators 3, 4, 5 and 6.

The individual transducers 7, 8, 9 and 10 operate to control the driving speed and power for the alternators as illustrated in Figure 2 for a single alternator 3 illustrative of each of the alternators and transducers, etc. of Figure 1.

As stated, the alternator 3 (Figure 2) supplies power through the alternator leads 19 and bus bars 2 to the load 1. The parallel connection of the other alternators is indicated generally by the arrowheaded leads 23. One of the leads 19 for the alternator 3 is coupled to a current transformer or real current sensing element or the like 15 feeding a current signal into the transducer system indicated generally at 7 and serially connectable with the transducers of the others of the alternators via lines 11 and 14.

Load division control in the transducer 7 for varying the driving characteristics for the alternator 3 is preferably accomplished through variably controlling the driving speed and force or torque of the alternator 3 at a drive unit 24 mechanically coupled to the alternator 3 and to a drive power source and control 25 as indicated in Figure 2.

I have also found, in accordance with the principles of the present invention, that the most advantageous type of transducer conversion mechanism is a position control two-phase servo-motor indicated generally by the box outline 26 including a real load current sensing winding or coil 27 on one phase and a reference coil or winding 28 which senses the real potential and a positioning control winding 29. These latter two windings 28 and 29, although illustrated as separated by a 90° phase difference are preferably in the same time phase and together are in time phase quadrature with the winding 27.

By properly positioning and electrically orienting these windings 27 and 28 and 29 about rotor 30 for the servo-motor mechanism converter unit 26, the system is adapted to operate in true watt meter character giving a positive real load sensing output by variation of the angular position of the rotor 30. This is particularly true when two or more of these systems are interconnected as described above with reference to Figure 1 and the interconnecting lines 11 and 14 indicated with arrowheads in Figure 2.

The characteristics from which this true watt meter function obtains will be further described hereinbelow in conjunction with the general operation of this preferred embodiment of the present invention operating in accordance with the principles of the present invention.

In preferred circuitry the output of the current transformer or current sensing winding 15 is coupled directly to the load or current winding 27 such that the lines 31 and 32, which interconnect these coils, are the lines to which the interconnecting lines 14 and 11 are respectively connected. The winding 15 preferably is connected in parallel with "on-off" set of control switch or relay contacts 33 which operate to short circuit the output of current transformer secondary 15 when in an "off" or closed position. A capacitor 34 is connected in parallel with the secondary winding 15, the winding 27 and the switch contacts 33.

The reference winding 28, which is the real potential sensing winding, is capacitively connected to ground on one side thereof through a capacitor 35 and at the other side thereof interconnected with one of the lines 19 and in particular, the one which includes current sensing winding 15. A variac or the like 36 also has one side thereof connected to ground and the other side thereof connected to the same one of the lines 19 and in addition, a rotary secondary-type transformer 37 has its primary 38 connected on one side to ground and on the other side to the same one of the lines 19. The secondary 39 of the rotary-type transformer 37 is mechanically coupled to a gear box or the like 40 which is also connected to the rotor 30 of the servo-motor mechanism 26 so that variations in the position of the rotor 30 are mechanically transmitted to the secondary 39 to vary its angular position with respect to the primary 38. The secondary 39 is also electrically coupled to the positioning control winding 29 to impress a potential thereon which is a function of the position of the rotor 30. Another signal impressed upon the position control winding 29, forming a part of the reference phase, is derived from the output of the variac 36 impressed across a resistor 41 which functionally operates as a safety resistor in the event of an opening in the circuit of the variac 36. The control arm 42 on the variac 36, controlling the potential impressed across the resistor 41 is "depressed" spring-biased or the like by such resilient means as the spring 43 with its movement limited by a variable and controllable stop means 44.

The angular position of the rotor 30 in the servo-motor 26, as dictated by the proper load division, etc., for the alternator 3, controls the angular position of the output of the gear box 40 as it is coupled to the rotatable secondary 39 of transformer 37 and a rotatable nut 45 coupled to the gear box 40 and substantially permanently fixed in its axial position. The rotating nut or the like 45 threadably engages a lead screw 46 operatively controlling the position of the piston assembly 47 in a droop control valve system 48 coupled to the drive power source and control and therethrough to the drive unit 24 to control the locus of the operation of the drive unit 24 and therefore the alternator 3 on the speed versus torque droop characteristic for the system; this characteristic may be either an inherent one or a manufactured one as desired, but it being preferred that the characteristic have about a 5% no load to full load droop as a manufactured droop characteristic.

It will be observed that rotation of the nut 45 in one direction will operate the droop control valve assembly for actuation in one direction while rotation in an opposite direction for the nut 45 will cause actuation of the droop control valve system in an opposite direction. The particular character of the droop control valve assembly is not critical and may be any desired form such as the dumbbell piston differential valve system illustrated or any other desired type operable within the principles of the present invention.

To understand the two operating characteristics of the system of the present invention, it is important to first understand the watt meter operational characteristic of the servo-motor converter arrangement as coupled into a complete system such as the complete system of Figure 1. It will be understood, of course, that the two phases of the torque motor have space quadrature included in the geometric considerations of the system and in time quadrature included by the excitation features of the system such that the real potential signal and the real current signal are in quadrature and hence, are in position to produce a positioning torque on the rotor 30.

For the sake of simplicity of explanation of the operating characteristics of this system and the watt meter characteristics of the servo-motor system and its associated circuitry it will be assumed that two systems are serially connected and each identical to the system shown in Figure 2. With reference to Figure 1, the alternators 3 and 4 and their associated circuit elements and control systems will be neglected. The current transformers 15 and 16 are then considered as being series connected as by the broken line interconnecting the lines 12 and 14 and indicated generally at 49. The secondaries of the current transformers are connected such that the induced E. M. F.'s therein are in series aiding. Thus, they are effectively short circuited when their induced E. M. F.'s are equal in amplitude and are in phase. Further assuming that the alternators are operating such that their torque angles and also their excitations are different, as a result, neither real load, nor reactive load will be divided equally. Consequently, corresponding line currents of the alternators 3 and 4 in question will differ both in amplitude and phase. It follows that the induced E. M. F. in the current transformer 15 will differ both in amplitude and phase from the induced E. M. F. in the current transformer 16. In view of this, the current transformers will no longer be effectively short circuited, instead, a voltage will exist at the terminals of each secondary.

These secondary voltages must be equal in amplitude and opposite in phase by virtue of the boundary conditions imposed by the short circuit across the series combination of the current transformers. Furthermore, as long as the current transformers are operated in the linear region of the magnetization curves of each thereof, the current transformer terminal voltages will be directly proportional to the vectorial difference between the line currents in the lines 19 and 20.

As a matter of analysis, a vector, which may be employed to represent the control phase M. M. F. due to the current in line 19, may be broken into two components, one of which represents the real component thereof and the other of which would represent the reactive component thereof. The real component, however, depends only on the real component of the vectorial difference between the current in line 19 and the current in line 20 because the control phase M. M. F. is only a function of the current in line 19. Similarly, the reactive component of the control phase M. M. F. depends only on the reactive component of the vectorial difference between the currents in the lines 19 and 20. In view of this, the developed rotor torque of the servo-motor can be made a unique function of the real load division simply by adjusting the reference phase M. M. F. such that it is in time quadrature with the real component of the control phase M. M. F. When this is done, as in the system of Figure 2, hereinabove described, operating in accordance with the principles of the present invention, the load trim circuit servo-motor combination will operate and does operate as a true watt meter such that the angular displacement and position of the rotors of each of the transducers is a direct representation of load division error corrected through the valve and drive control system as a part of the transducer system.

Another important feature of the present invention resides in its zero seeking characteristics. Of immediate importance to an understanding of the zero seeking characteristics is the transformer 37 (Figure 2) since it is substantially the heart of the positioning servo. Schematically, it has been shown as a transformer constructed in such a fashion that the secondary can be rotated with respect to the primary. In view of this, the output voltage of the secondary is a function of the angle of rotation. In particular, the amplitude of the output voltage is proportional to the angular displacement from the null position while the phase is dependent only upon the sense of displacement.

The rotating secondary of the transformer 37 is geared directly to the output of the servomotor 26 through the gear box 40. Consequently, the excitation of the control phase positioning winding 29 depends only upon the angular position of the secondary 39 which is directly controlled by the angular position of the output shaft of the servo-motor.

As a result of this desired and deliberate condition incorporated through the principles of the present invention, in order to make the servo-motor rotor seek zero angular displacement, it is only necessary to connect the coil 29 to the secondary 39 such that increasing clockwise angular position of the rotor 30 results in increasing counterclockwise developed rotor torque, and vice versa for counterclockwise angular positioning of the rotor 30.

Another important feature of the positioning winding control circuit is incorporated therein through the variac or the like 36 connected to present an additional signal to the positioning winding 29 in accordance with the following principles.

By the provision of the signal transmitted to the position control winding 29 from the variac or the like 36, the system of the present invention is provided with remote control for manually varying the angular position of the rotor 30 and hence, manually varying the precise load division portion for each of the alternators. This may be accomplished by providing the variac or the like 36 at a remote control station and adjustment of the manually controlled stop means 44, adjusting the position of the arm 42 as it is urged thereagainst by the "depress" bias spring, controls the signal transmitted from the variac to the position control winding 29.

The variac or the like 36 also operates to include another important feature into the system of the present invention in accordance with the principles thereof by providing means for varying the speed of each individual alternator to connect or disconnect it with the remainder of the system. To couple another alternator onto the system it is necessary to reduce the speed thereof to the frequency of the system immediately prior to connecting the same onto the line so that it will be in synchronism with the system prior to closing of the breakers or the like interconnecting the same. To accomplish this the arm 42 is moved against the spring 43, thereby changing the signal from the variac 36 and reducing the speed of the drive unit 24 and the alternator 3. Upon connection of the system release of the arm 42 permits the biasing spring 43 to move the arm back into its adjusted position against the stop 44.

To remove any individual alternator from its line connection the reverse process is followed with great ease and simplicity by virtue of the characteristics and principles of the present invention incorporated in any preferred embodiment thereof.

From the above it will be clearly understood that by the principles of the present invention I have provided a new and improved servo load trim control system which is operable to maintain load division between parallel alternators within close tolerance limits of the boundary defined by the average load. A preferred range of load division is within 10% plus or minus of the average load and systems embodying the principles of the present invention are operable well within that preferred range. In addition, of course, the system of the present invention includes the above described unique operational features and characteristics as described.

From the foregoing it will be seen that numerous modifications and variations may be effected without departing from the true spirit and scope of the present invention and the principles thereof. I, therefore, intend, by the appended claims, to cover all such modifications and variations as fall within the true spirit and scope of my invention.

I claim as my invention:

1. In a load division control system operable to effect load division between paralleled alternators, in combination, a position controlled servo-motor mechanism, and power input drive and control means for an alternator coupled to said position controlled servo-motor mechanism for actuation by variation in the angular position of said servo-motor.

2. In a load division control system operable to effect load division between paralleled alternators, in combination, a position controlled servo-motor mechanism and power input drive and control means for an alternator coupled to said position controlled servo-motor mechanism for actuation by variation in the angular position of said servo-motor, said servo-motor mechanism including angular positioning elements therein operable to be remotely controlled to remotely affect increases and decreases in an operating parameter of the alternator.

3. In a load division control system operable to effect load division between paralleled alternators, in combination, a position controlled servo-motor mechanism, and angular positioning elements therein operable to be remotely controlled to remotely affect increases and decreases in an operating parameter of the alternator.

4. In a load division control system operable to effect load division trimming, in combination, a position controlled servo-motor mechanism, power control means coupled to said position controlled servo-motor mechanism for actuation by variation in the angular position of said servo-motor, and zero seeking elements forming circuitry operable upon said servo-motor mechanism to urge the same to a preselected angular position therefor.

5. In a load division control system operable to effect load division trimming, in combination, a position controlled servo-motor mechanism, and zero seeking elements forming circuitry operable upon said servo-motor mechanism to urge the same to a preselected angular position therefor.

6. A servo-motor load division trim system comprising a load sensing servo-motor mechanism, a positioning control winding in said mechanism, a servo-motor rotor in said mechanism, a positioning signal source coupled to said winding, and mechanism coupled to said rotor operative to vary preselected parameters in a loaded system to be controlled and means coupling said rotor to said latter mechanism, said means coupling said rotor and said source whereby angular variations in the position of said rotor are conducted through said means to vary said source and impress a zero seeking signal on said winding.

7. A servo-motor load division trim system comprising a load sensing servo-motor mechanism, a positioning control winding in said mechanism, a servo-motor rotor in said mechanism, a positioning signal source coupled to said winding, and means coupling said rotor and said source whereby angular variations in the position of said rotor are conducted through said means to vary said source and impress a zero seeking signal on said winding.

8. A servo-motor load division trim system comprising a load sensing servo-motor mechanism, a positioning control winding in said mechanism, a servo-motor rotor in said mechanism, a remotely controllable and adjustable positioning signal source coupled to said winding, and means coupling said rotor and said source whereby angular variations in the position of said rotor are conducted through said means to vary said source and impress a zero seeking signal on said winding.

9. A servo-motor load division trim system operable to maintain load division between a plurality of paralleled alternators driven by individual drive units within a preselected proportional range of the average load including interconnected trim control systems at each of said alternators comprising a load sensing servo-motor mechanism, a positioning control winding in said mechanism, a servo-motor rotor in said mechanism, a positioning signal source coupled to said winding, and mechanism coupled to said rotor operative to vary preselected parameters in the alternator drive units, and means coupling said rotor to said latter mechanism, said means coupling said rotor and said source whereby angular variations in the position of said rotor are conducted through said means to vary said source and impress a zero seeking signal on said winding.

10. A servo-motor load division trim system operable to maintain load division between a plurality of paralleled alternators driven by individual drive units within a preselected proportional range of the average load including interconnected trim control systems at each of said alternators comprising a load sensing servo-motor mechanism, a positioning control winding in said mechanism, a remotely controllable and adjustable positioning signal source coupled to said winding mechanism and said rotor operative to vary preselected parameters in the alternator drive units, and means coupling said rotor to said latter mechanism, and means coupling said rotor and said source whereby angular variations in the position of said rotor are conducted through said means to vary said source and impress a zero seeking signal on said winding.

11. In an alternator control system to control operating parameters of an alternator, a position controlled servo-motor mechanism, alternator output sensing windings in said servo-motor mechanism, an additional signal sensing winding in said servo-motor mechanism, and remotely controllable means to supply a supplementary control signal to said additional winding and coupled to said additional winding to remotely control said servo-motor mechanism and thereby remotely control the alternator and the operating parameters thereof.

12. In an alternator control system to control operating parameters of an alternator, a position controlled servo-motor mechanism, alternator output sensing windings in said servo-motor mechanism, an additional signal sensing winding in said servo-motor mechanism, and remotely controllable manual means to supply a supplementary control signal to said additional winding and coupled to said additional winding to remotely control said servo-motor mechanism and thereby remotely control the alternator and the operating parameters thereof.

13. In an alternating control system to control operating parameters of an alternator, a power drive and control mechanism to drive the alternator, a position controlled servo-motor mechanism coupled to said power drive and control mechanism, alternator output sensing windings in said servo-motor mechanism, an additional signal sensing winding in said servo-motor mechanism, and remotely controllable manual means to supply a supplementary control signal to said additional winding and coupled to said additional control winding to remotely control said servo-motor mechanism and thereby remotely control the alternator and the operating parameters thereof.

14. In an alternator control system to control operating parameters of a plurality of alternators and control load division therebetween, servo-motor mechanisms coupled to said alternators respectively to control operation of the respective alternators including the driving speed thereof, and signal means connected to each of said servo-motor mechanisms respectively to remotely control the same and to vary the speed of the alternators respectively whereby the alternators may be connected together and disconnected from each other.

15. In an alternator control system to control operating parameters of a plurality of alternators and control load division therebetween, servo-motor mechanisms coupled to each of said alternators respectively to control operation of the respective alternators including the speed thereof, means interconnecting the servo-motor mechanisms to coordinate operation thereof and to effect load division between the alternators, and manually operable signal means connected to each of said servo-motor mechanisms respectively to remotely control the same and to vary the speed of the alternators respectively whereby the alternators may be connected together and disconnected from each other.

16. In an alternator control system to control operating parameters of a plurality of alternators and control load division therebetween, servo-motor mechanisms coupled to each of said alternators respectively to control operation of the respective alternators including the speed thereof, means interconnecting the servo-motor mechanisms to coordinate operation thereof and to effect load division between the alternators, and signal means connected to each of said servo-motor mechanisms respectively to remotely control the same and to vary the speed of the alternators respectively whereby the alternators may be connected together and disconnected from each other.

References Cited in the file of this patent

UNITED STATES PATENTS

| Number | Name | Date |
|---|---|---|
| 1,959,163 | Hamilton et al. | May 15, 1934 |
| 2,073,426 | Pearson | Mar. 9, 1937 |
| 2,168,575 | Newell | Aug. 8, 1939 |
| 2,401,163 | Keller | May 28, 1946 |
| 2,404,968 | Leyer | July 30, 1946 |
| 2,435,419 | Bany | Feb. 3, 1948 |
| 2,504,768 | Watson et al. | Apr. 18, 1950 |
| 2,563,179 | Malsbary | Aug. 7, 1951 |
| 2,577,003 | Curtis | Dec. 4, 1951 |
| 2,590,023 | Lewis et al. | Mar. 18, 1952 |
| 2,594,133 | Davis et al. | Apr. 22, 1952 |
| 2,632,856 | Dupy | Mar. 24, 1953 |